United States Patent
Li

(10) Patent No.: US 9,886,933 B2
(45) Date of Patent: Feb. 6, 2018

(54) BRIGHTNESS ADJUSTMENT SYSTEM AND METHOD, AND MOBILE TERMINAL

(71) Applicant: BOE TECHNOLOGY GROUP CO., LTD., Beijing (CN)

(72) Inventor: Xin Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 329 days.

(21) Appl. No.: 14/739,891

(22) Filed: Jun. 15, 2015

(65) Prior Publication Data

US 2016/0293140 A1    Oct. 6, 2016

(30) Foreign Application Priority Data

Mar. 30, 2015  (CN) .......................... 2015 1 0146208

(51) Int. Cl.
| | |
|---|---|
| *G09G 5/00* | (2006.01) |
| *G09G 5/10* | (2006.01) |
| *G06F 3/01* | (2006.01) |
| *G06F 3/03* | (2006.01) |

(52) U.S. Cl.
CPC .............. *G09G 5/10* (2013.01); *G06F 3/013* (2013.01); *G06F 3/03* (2013.01); *G09G 5/00* (2013.01); *G09G 2320/0626* (2013.01); *G09G 2354/00* (2013.01); *G09G 2370/22* (2013.01)

(58) Field of Classification Search
CPC .. G06F 3/013; G06F 3/03; G06F 3/01; G09G 5/00; G09G 5/10; G09G 2320/0626; G09G 2354/00; G09G 2370/22; G09G 2360/144; G09G 3/20; G09G 3/34; G09G 3/36

See application file for complete search history.

(56) References Cited

U.S. PATENT DOCUMENTS

| | | | |
|---|---|---|---|
| 9,671,869 B2* | 6/2017 | Katz | ........................ G06F 3/017 |
| 2008/0111833 A1 | 5/2008 | Thorn et al. | |
| 2013/0194394 A1* | 8/2013 | Shintani | ................. G02B 27/26 |
| | | | 348/51 |

(Continued)

FOREIGN PATENT DOCUMENTS

| | | |
|---|---|---|
| CN | 101567171 A | 10/2009 |
| CN | 103165102 A | 6/2013 |

(Continued)

OTHER PUBLICATIONS

First Chinese Office Action, for Chinese Patent Application No. 2015101462089, dated Nov. 14, 2016, 13 pages.

*Primary Examiner* — Nelson Rosario
(74) *Attorney, Agent, or Firm* — Kinney & Lange, P.A.

(57) ABSTRACT

Discloses is a brightness adjustment system and method, and a mobile terminal. The brightness adjustment system is used for a display device, and comprises: a distance measurement module configured to measure a perpendicular viewing distance from user's eyes to a display surface of the display device; and a brightness adjustment module configured to adjust the brightness of the display device to desired brightness based on the measured perpendicular viewing distance. The brightness adjustment system renders the display device, such as mobile terminal, etc., to automatically adjust the brightness based on the perpendicular viewing distance between the user's eyes and the display surface of the display device, satisfying requirements for display brightness.

18 Claims, 3 Drawing Sheets

(56) References Cited

U.S. PATENT DOCUMENTS

2015/0082181 A1* 3/2015 Ames .................. G06F 3/04815
                                              715/738
2017/0045936 A1* 2/2017 Kakapuri ................ G06F 3/011

FOREIGN PATENT DOCUMENTS

| CN | 103578430 A | 2/2014 |
| CN | 104133548 A | 11/2014 |
| CN | 104468912 A | 3/2015 |

* cited by examiner

BRIGHTNESS ADJUSTMENT SYSTEM AND METHOD, AND MOBILE TERMINAL

CROSS-REFERENCE TO RELATED APPLICATION

This application claims the benefit of Chinese Patent Application No. 201510146208.9 filed on Mar. 30, 2015 in the State Intellectual Property Office of China, the disclosure of which is incorporated in entirety herein by reference.

BACKGROUND OF THE INVENTION

Field of the Invention

The present disclosure relates to a technical field of display, in particular, relates to a brightness adjustment system and method, and a mobile terminal.

Description of the Related Art

The mobile terminal (for example, mobile phone, or tablet personal computer) in the prior art may detect ambient brightness using optical sensor to adjust display brightness. However, such brightness adjustment means fails to take into account the distance between user's eyes and the mobile terminal, which is a key parameter. For example, in the case that the distance between user's eyes and the mobile terminal is relatively larger, meanwhile the user is under a circumstance where light is insufficient, the adjusted display brightness only based on ambient brightness will not meet requirements. Under such a situation, manual adjustment has to be implemented to achieve appropriate display brightness.

SUMMARY OF THE INVENTION

To overcome above problems and defects in the prior art, the present invention provides a brightness adjustment system and method, and a mobile terminal, to adjust automatically the display brightness based on the perpendicular viewing distance between user's eyes and the mobile terminal.

According to the first aspect of the present invention, there is provided a brightness adjustment system for a display device, comprising: a distance measurement module configured to measure a perpendicular viewing distance from user's eyes to a display surface of the display device; and a brightness adjustment module configured to adjust the brightness of the display device to desired brightness based on the measured perpendicular viewing distance.

According to the second aspect of the present invention, there is provided a brightness adjustment method using the brightness adjustment system described above, comprising steps of: measuring the perpendicular viewing distance from the user's eyes to the display surface of the display device; and adjusting the brightness of the display device to the desired brightness based on the measured perpendicular viewing distance.

According to the third aspect of the present invention, there is provided a mobile terminal, comprising the brightness adjustment system described above.

According to the brightness adjustment system and method, and the mobile terminal provided in the embodiments of the present invention, the perpendicular viewing distance from the user's eyes to the display surface of the display device is measured by the distance measurement module, and the brightness of the display device is adjusted to appropriate brightness based on the measured perpendicular viewing distance by the brightness adjustment module connected to the distance measurement module. The display device, such as mobile terminal, etc., may automatically adjust the brightness based on the perpendicular viewing distance between user's eyes and the display surface of the display device, satisfying requirements for display brightness.

BRIEF DESCRIPTION OF THE DRAWINGS

The above and other features of the present invention will become more apparent by describing in detail exemplary embodiments thereof with reference to the accompanying drawings by way of examples. Throughout the drawings, same reference numerals represent same or similar members.

DETAILED DESCRIPTION OF PREFERRED EMBODIMENTS OF THE INVENTION

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various embodiments and implementations other than those explicitly described are within the scope of the following claims.

Figure 1:
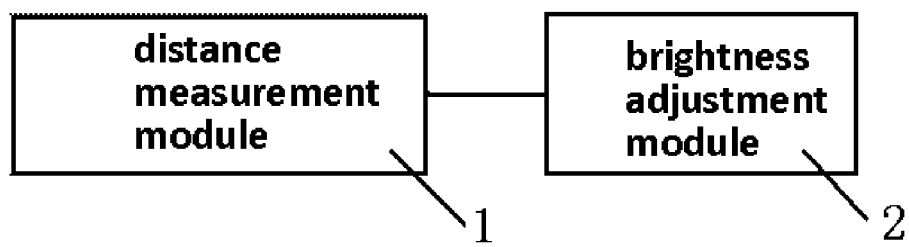
FIG. 1 is a block diagram showing the principle of a brightness adjustment system according to a first embodiment of the present invention.

The present invention provides a brightness adjustment system for a display device, as shown in FIG. 1, which comprises: a distance measurement module 1 configured to measure a perpendicular viewing distance from user's eyes to a display surface of the display device; a brightness adjustment module 2 electrically connected with the distance measurement module 1, and configured to adjust the brightness of the display device to desired brightness based on the measured perpendicular viewing distance. By means of the brightness adjustment system, the display device may automatically adjust the brightness based on the perpendicular viewing distance between user's eyes and the display surface of the display device, various requirements of the user for display brightness are therefore satisfied.

Figure 2:
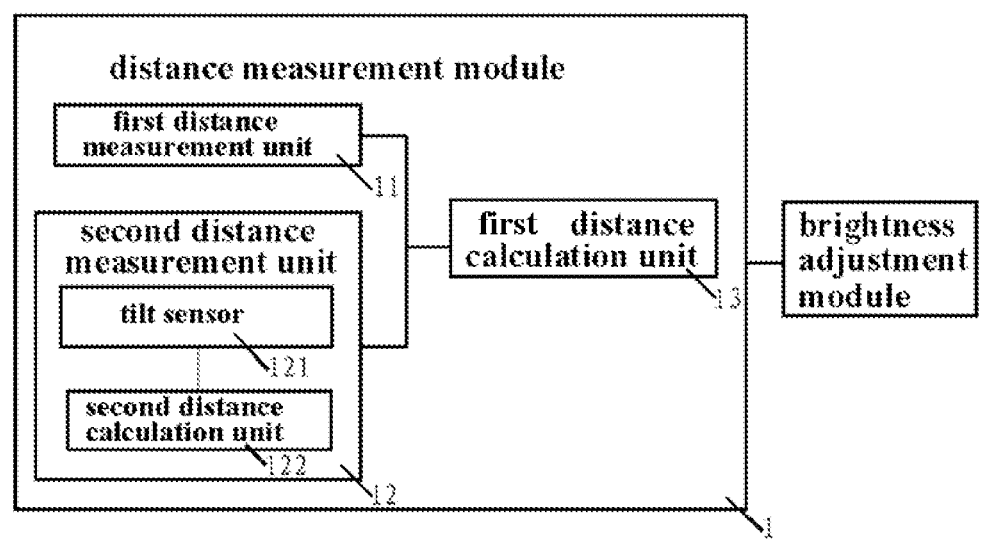
FIG. 2 is a further block diagram showing the principle of the brightness adjustment system shown in FIG. 1.
Figure 3:
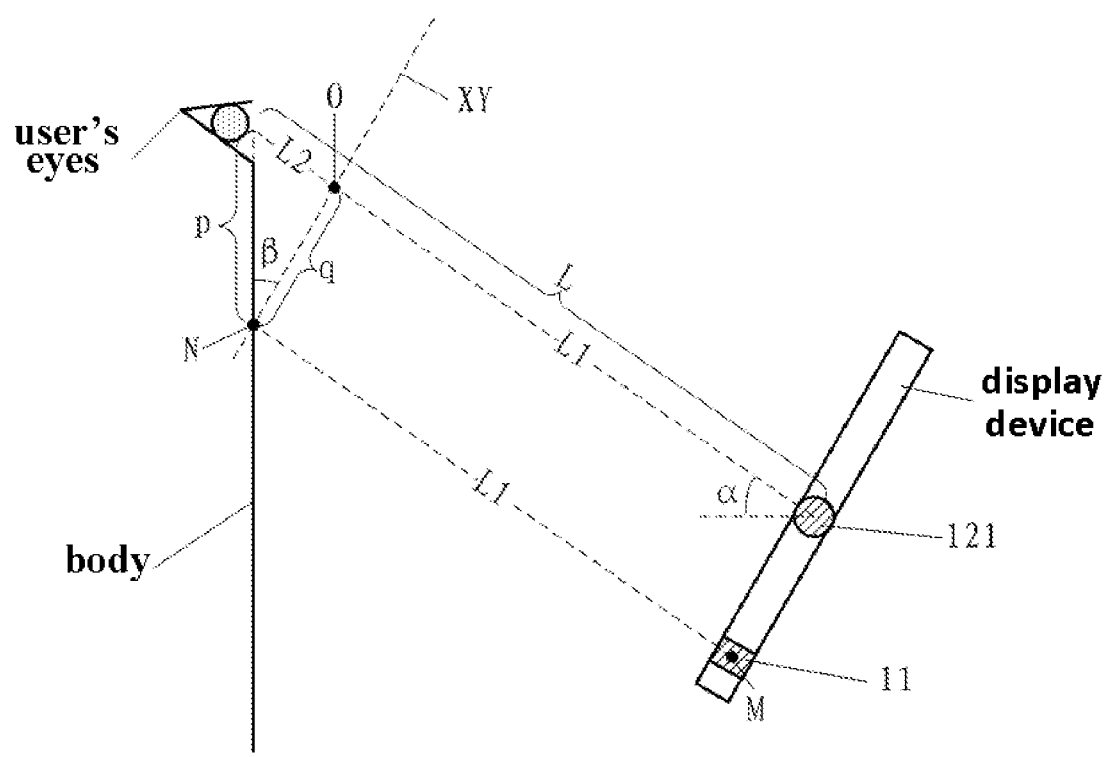
FIG. 3 is a schematic view showing the principle for measuring distance in the brightness adjustment system according to an embodiment of the present invention.

In an exemplary embodiment, as shown in FIGS. 2 and 3, the distance measurement module 1 comprise a first distance measurement unit 11 configured to measure a first distance L1, which is a perpendicular distance between the display surface of the display device and a virtual plane XY, wherein the virtual plane XY is set as such a plane that is located between user's eyes and the display surface of the display device, parallel with the display surface of the display device, and intersected at a point N with a line where the user's approximately vertical body is located, and a line connecting said point N with the position M of the first distance measurement unit 11 provided in the display device is perpendicular to the display surface of the display device and the virtual plane XY. The distance measurement module 1 further comprises a second distance measurement unit 12 configured to measure a second distance L2, which is a perpendicular distance from the user's eyes to the virtual plane XY; and a first distance calculation unit 13 electrically connected to the first distance measurement unit 11 and the second distance measurement unit 12, respectively, and configured to determine the perpendicular viewing distance L by calculating the measured first distance L1 and second distance L2.

In an embodiment, as shown in FIG. 3, to achieve the perpendicular viewing distance L from the user's eyes to the display surface of the display device, L is divided into two a first distance L1 and a second distance L2, thus L may be achieved by adding L1 and L2 after measuring L1 and L2.

The first distance L1 may be directly measured by the first distance measurement unit 11, which may employ an image sensor or a photoelectric sensor. If employing an image sensor, it may be used to capture an image of the body at point N, for example, it is possible to analyze definition of images by a software installed in the display device and achieve an approximate shooting distance (i.e. L1) when capturing the images at point N based on focusing principle. If employing a photoelectric sensor, the photoelectric sensor is operated to emit rays for detecting, such as infrared ray, etc., which is perpendicular to the display surface of the display device, to the body, the emitted rays are directed onto the body at point N and then reflected therefrom to the photoelectric sensor, thereby the first distance L1 is achieved. In an exemplary embodiment, the photoelectric sensor comprises: a light source configured to emit light to user's body; and a light receiver configured to receive the light reflected from user's body, and L1 is achieved based on the light signal emitted and the reflected and received light signal.

Figure 4:
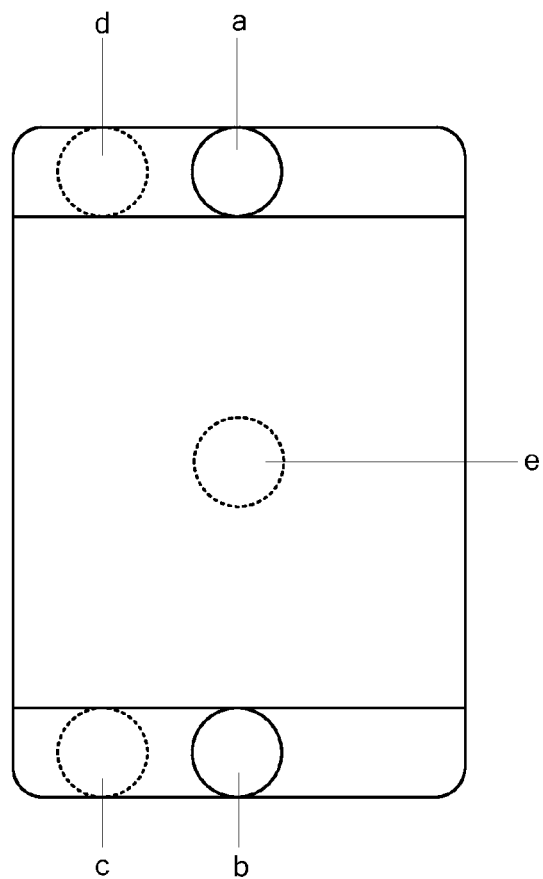
FIG. 4 is a schematic view showing the layout for a first distance measurement unit of the brightness adjustment system according to an embodiment of the present invention.

It is noted that, in this embodiment, the first distance measurement unit 11 may be provided in a non-display area of the display device, without affecting the image display quality of the display device. As shown in FIG. 4, for example, it is available to be provided on the area of a front camera (for example, point a), the non-display area near to the front camera (for example, point d), the area of certain keys of the display device such as HOME key, etc. (for example, point b), or the non-display area near to certain keys of the display device such as HMOE key, etc. (for example, point c). If the first distance measurement unit 11 comprises an image sensor, the front camera of the display device may be used as the first distance measurement unit 11, thereby no additional members of the display device are required. The first distance measurement unit 11 may also be provided in the display area of the display device (for example, point e) by being integrated inside a display panel of the display device.

The second distance L2 may be achieved by the second distance measurement unit 12 based on trigonometric function principle. The second distance measurement unit 12 may comprise: a tilt sensor 121 configured to measure a tilt angle α of the display surface of the display device with respect to the user's body; and a second distance calculation unit 122 connected to the tilt sensor 121 and configured to calculate the second distance L2 based on the measured tilt angle α. Wherein, the tilt sensor 121 is a gyroscope, for example.

The tilt angle α measured by the tilt sensor 121 is equal to the angle β formed by the body with respect to the virtual plane XY. The distance q between point N and point O (an intersection point of a line, through the user's eyes and perpendicular to the virtual plane XY, and the virtual plane XY) is equal to the distance between the position M of the first distance measurement unit 11 and an intersection point of a line, through the user's eyes and perpendicular to the display surface of the display device, and display surface of the display device. Since an angle range of user's view with respect to the display device is generally determined, the distance q may be generally determined by two specific points predefined on the display device, for example, as shown in FIGS. 3 and 4, a perpendicular distance from the center of the display device to a line, which is parallel with a lower edge of the display device through point M, i.e., the distance between the tilt sensor 121 and the first distance measurement unit 11. Then the second distance L2 may be calculated based on the tangent function, L2=q×tan β=q×tan α.

In this embodiment, the tilt sensor 121 is substantially provided in the center of the display surface of the display device to measure value a accurately. Further, the above distance q is approximately equal to the distance between the tilt sensor 121 and the first distance measurement unit 11.

It is noted that, if the brightness adjustment system fails to adjust the brightness automatically when the body is kept in a steady state with respect to the display device, the reason may be that the distance measurement module 1 fails to measure the perpendicular viewing distance L from the user's eyes to the display surface of the display device, more specifically, the body may be out of the measurement range of the first distance measurement unit 11 of the distance measurement module 1. For example, if the first distance measurement unit 11 is an image sensor, which is provided on the upper of the display device, it is possible that the capturing field of the image sensor is located above the user's eyes, thus the image sensor can't capture the body. As another example, if the first distance measurement unit 11 is a photoelectric sensor, which is provided on the upper of the display device, it is possible that the detecting rays emitted by the photoelectric sensor is above the user's eyes, and can't reach and reflect from the body. Under such a situation, it is just necessary to move the body with respect to the display device or move the display device with respect to the body, to make the body back into the measurement range of the first distance measurement unit 11, the brightness adjustment system would work normally to adjust the brightness automatically. It will be appreciated that, if the first distance measurement unit 11 is provided below the center of the display device, it is advantageous to make the first distance measurement unit 11 be located in a appropriate position by hand to carry out measurement. In this case, L=L1+L2=L1+q×tan α, i.e., the perpendicular viewing distance L is a sum of the first distance and the second distance.

In another embodiment, if the first distance measurement unit 11 is provided above the center of the display device, for example, located at point a as shown in FIG. 4, it may be calculated as based on geometric principle:

$$L = L1 - L2 = L1 - q \times \tan \alpha$$

That is, the perpendicular viewing distance L is a difference between the first distance and the second distance.

In addition, to describe clearly the above detailed embodiment about measurement of the perpendicular viewing distance L, herein the body is deemed as a line, the display surface of the display device is deemed as a plane, the user's eyes and the first distance measurement unit 11 are both deemed as a point.

It should be noted that, the method for measuring the perpendicular viewing distance L from the user's eyes to the display surface of the display device provided above is only exemplary. In other embodiments of the present invention, it is possible to achieve the perpendicular viewing distance L by means of other methods (for example, measure the perpendicular viewing distance L directly by the image sensor or the photoelectric sensor).

Figure 5:
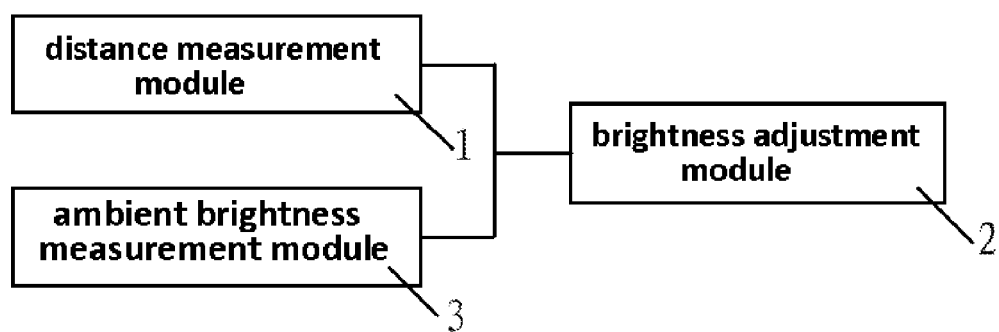
FIG. 5 is a block diagram showing the principle of a brightness adjustment system according to a second embodiment of the present invention.

In an embodiment, as shown in FIG. 5, the brightness adjustment system may further comprise an ambient brightness detection module 3 connected to the brightness adjustment module 2 and configured to sense and measure ambient brightness. The brightness adjustment module 2 is further configured to adjust the brightness of the display device to appropriate brightness based on the measured perpendicular viewing distance L and ambient brightness. In the brightness adjustment system, the perpendicular viewing distance L is measured by the distance measurement module 1, the ambient brightness is measured by the ambient brightness detection module 3, then the brightness adjustment module 2 adjusts the brightness of the display device based on two aspects, the perpendicular viewing distance L and the ambient brightness. In this way, the display device may adjust the brightness automatically to meet requirements under various situations, and it is facilitated to use the display device, improving user experience.

According to the second aspect of the present invention, there is provided a brightness adjustment method using the brightness adjustment system described above, comprising steps of: measuring the perpendicular viewing distance from the user's eyes to the display surface of the display device; and adjusting the brightness of the display device to the desired brightness based on the measured perpendicular viewing distance. In the brightness adjustment method, the perpendicular viewing distance from user's eyes to the display surface of the display device is taken as a parameter, depending on which the brightness is adjusted automatically, meeting requirements for display brightness.

As to the detailed method to measure the perpendicular viewing distance, since it has been described in the above embodiments of the brightness adjustment system, description thereof in detail is omitted herein.

The brightness adjustment method according to an embodiment of the present invention further comprises steps of: sensing and measuring ambient brightness; adjusting the brightness of the display device to desired brightness based on the measured perpendicular viewing distance and ambient brightness. Said brightness adjustment method adjusts the brightness based on two aspects, the perpendicular viewing distance L from the user's eyes to the display surface of the display device and the ambient brightness, thereby the brightness of the display device adjusted automatically meets user's requirements more perfectly.

According to the third aspect of the present invention, there is provided a mobile terminal, comprising the brightness adjustment system described in the above embodiments, which has a function to adjust brightness automatically, and the brightness adjusted meets user's requirements more perfectly.

It should be noted that, said mobile terminal may be in the form of liquid crystal, electronic paper, or OLED (Organic Light-Emitting Diode), etc., and it may be a product or component, such as mobile phone, or tablet personal computer, etc.

Although several exemplary embodiments have been shown and described, the present invention is not limited to those and it would be appreciated by those skilled in the art that various changes or modifications may be made in these embodiments without departing from the principles and spirit of the disclosure, which should fall within the scope of the present invention. The scope of the invention is defined by the claims and their equivalents.

What is claimed is:

1. A brightness adjustment system for a display device, comprising:
   a distance measurement module configured to measure a perpendicular viewing distance from a user's eyes to a display surface of the display device; and
   a brightness adjustment module configured to adjust the brightness of the display device to desired brightness based on the measured perpendicular viewing distance,
   wherein the distance measurement module comprises:
   a first distance measurement unit configured to measure a first distance, which is a perpendicular distance between the display surface of the display device and a virtual plane, the virtual plane being parallel with the display surface and being intersected at a point with a first line where the user's vertical body is located, and a second line for connecting said point with the position of the first distance measurement unit being perpendicular to the display surface;
   a second distance measurement unit configured to measure a second distance, which is a perpendicular distance from the user's eyes to the virtual plane; and
   a first distance calculation unit configured to determine the perpendicular viewing distance by calculating the measured first distance and second distance.

2. The brightness adjustment system according to claim 1, wherein the first distance measurement unit comprises an image sensor or a photoelectric sensor.

3. The brightness adjustment system according to claim 2, wherein the first distance measurement unit comprises a photoelectric sensor that comprises:
   a light source configured to emit light to the user's body; and
   a light receiver configured to receive the light reflected from the user's body.

4. The brightness adjustment system according to claim 1, wherein the first distance measurement unit is provided in a non-display area of the display device.

5. The brightness adjustment system according to claim 1, wherein the second distance measurement unit comprises:
   a tilt sensor configured to measure a tilt angle of the display surface of the display device with respect to the user's body; and
   a second distance calculation unit configured to determine the second distance based on the measured tilt angle.

6. The brightness adjustment system according to claim 5, wherein the tilt sensor is provided in a center of the display surface of the display device, and the second distance calculation unit is further configured to determine the second distance based on the measured tilt angle and a distance between the first distance measurement unit and the tilt sensor.

7. The brightness adjustment system according to claim 6, wherein the second distance measurement unit is provided below the display device, and the first distance calculation unit determines the perpendicular viewing distance by calculating the sum of the measured first distance and second distance.

8. The brightness adjustment system according to claim 5, wherein the tilt sensor comprises a gyroscope.

9. The brightness adjustment system according to claim 1, further comprising an ambient brightness detection module configured to sense and measure ambient brightness;
the brightness adjustment module being further configured to adjust the brightness of the display device to the desired brightness based on the measured perpendicular viewing distance and ambient brightness.

10. A brightness adjustment method using the brightness adjustment system according to claim 1, comprising steps of:
measuring the perpendicular viewing distance from the user's eyes to the display surface of the display device; and
adjusting the brightness of the display device to the desired brightness based on the measured perpendicular viewing distance.

11. The brightness adjustment method according to claim 10, wherein the brightness adjustment system comprises an ambient brightness detection module, and the brightness adjustment method further comprises steps of:
sensing and measuring ambient brightness; and
adjusting the brightness of the display device to the desired brightness based on the measured perpendicular viewing distance and ambient brightness.

12. A mobile terminal, comprising the brightness adjustment system according to claim 1.

13. The mobile terminal according to claim 12, wherein the first distance measurement unit comprises an image sensor or a photoelectric sensor.

14. The mobile terminal according to claim 13, wherein the first distance measurement unit comprises a photoelectric sensor that comprises:
a light source configured to emit light to the user's body; and
a light receiver configured to receive the light reflected from the user's body.

15. The mobile terminal according to claim 13, wherein the second distance measurement unit comprises:
a tilt sensor configured to measure a tilt angle of the display surface of the display device with respect to the user's body; and
a second distance calculation unit configured to determine the second distance based on the measured tilt angle.

16. The mobile terminal according to claim 15, wherein the tilt sensor is provided at a center of the display surface of the display device, and the second distance calculation unit is further configured to determine the second distance based on the measured tilt angle and the distance between the first distance measurement unit and the tilt sensor.

17. The mobile terminal according to claim 15, wherein the tilt sensor is a gyroscope.

18. The mobile terminal according to claim 12, wherein, the brightness adjustment system further comprises an ambient brightness detection module configured to sense and measure ambient brightness; and
the brightness adjustment module is further configured to adjust the brightness of the display device to the desired brightness based on the measured perpendicular viewing distance and ambient brightness.

* * * * *